United States Patent [19]

Maeda et al.

[11] Patent Number: 4,647,145
[45] Date of Patent: Mar. 3, 1987

[54] METHOD OF AND APPARATUS FOR OBTAINING IMAGE DATA

[75] Inventors: Kiyoshi Maeda, Takatsuki; Kunio Tomohisa, Kyoto, both of Japan

[73] Assignee: Dainippon Screen Mfg. Co., Ltd., Kyoto, Japan

[21] Appl. No.: 548,307

[22] Filed: Nov. 3, 1983

[30] Foreign Application Priority Data

Feb. 15, 1983 [JP] Japan ................................ 58-23374

[51] Int. Cl.⁴ .............................................. G02B 26/10
[52] U.S. Cl. ...................................... 350/6.8; 358/298; 250/236
[58] Field of Search .......................... 350/6.8, 6.7, 6.5; 382/62, 65, 54; 358/298; 250/236

[56] References Cited

U.S. PATENT DOCUMENTS

| | | | |
|---|---|---|---|
| 3,928,759 | 12/1975 | Sansone | 350/6.8 |
| 3,947,816 | 3/1976 | Rabedeau | 350/6.8 |
| 4,080,634 | 3/1978 | Schreiber | 358/298 |
| 4,319,268 | 3/1982 | Yamada | 358/75 |
| 4,384,272 | 5/1983 | Tanaka et al. | 382/65 |

FOREIGN PATENT DOCUMENTS

| | | | |
|---|---|---|---|
| 54-22122 | 8/1979 | Japan. | |
| 0032415 | 2/1982 | Japan | 350/6.8 |

*Primary Examiner*—John K. Corbin
*Assistant Examiner*—Loha Ben
*Attorney, Agent, or Firm*—Lowe Price LeBlanc Becker & Shur

[57] ABSTRACT

An image signal is obtained by scanning an original picture using a sharp beam and an unsharp beam which are different in phase in an image reproducing system.

4 Claims, 7 Drawing Figures

METHOD OF AND APPARATUS FOR OBTAINING IMAGE DATA

FIELD OF THE INVENTION

This invention relates to a method and apparatus for of scanning an original picture, particularly to such a method and apparatus for a laser beam scanner in which the details of the picture are emphasized.

More precisely, this invention relates to such a method having functional steps of scanning an original picture in the main scanning direction by using two beams of which beam diameters are distinct in size with each other to obtain a sharp signal (regular image data) and an unsharp signal, computing out detail-emphasized image data by using said sharp and unsharp signals, and driving a recording beam with the detail-emphasized image data to record a clearer reproduction image.

BACKGROUND OF THE INVENTION

Conventionally, the following methods are known for detecting a regular image signal (mentioned "a sharp signal" hereinafter) and an unsharp signal in a laser beam scanner system.

One of the methods comprises processes of scanning an original picture with two beams for obtaining the sharp and the unsharp signals, obtaining beams informed with picture data by sole photo-sensor, and detecting both signals from the beams. In this method, as disclosed in U.S. Pat. No. 4,080,634, one of the beams for obtaining the sharp and the unsharp signals is modulated and the beams must be coaxially arranged in order to discriminate both signals. Then the beams reflected at or transmitted through the original picture are detected by the sole photo-sensor, and the sharp and the unsharp signals are discriminated by decoding the detected signal.

However this kind of method has a defect that both signals cannot completely be discriminated even when the decoding work is done in perfect condition.

In addition, a modulation frequency for said beam must be higher than a scanning frequency, which leads to unstable modulation in company with increase of the scanning frequency.

Another method employs a way of detecting a sharp and an unsharp signals by respective photo-sensors. In this method, as disclosed in Japanese Patent Publication No. 54-22122, two beams of different wavelength are used for obtaining the sharp and the unsharp signals, for example a red beam is used for the former signal and a blue beam is used for the latter signal, and the photo-sensors have distinct color filters to detect respective beams of proper wavelength.

In this kind of method, no such defects as in the method mentioned at first exists, but another problem takes place. That is, it is apprehended that unexpected detail-emphasis signals (unsharp mask signals) are detected on the red or blue portions of an original picture when it is colored.

Moreover, as two photo-sensors are used,-there is a difficulty to pair them up.

The other method employs a way of digitally computing image data of an original picture to obtain a detail emphasized signal as disclosed in U.S. Pat. No. 4,319,268. However this method has difficulties that a memory is necessary to store image data of a scanning line along with of the scanning lines before and behind the scanning line, and that a complicated computer module is required to digitally compute the image data on a pixel scale.

SUMMARY OF THE INVENTION

This invention is made to resolve the above defects as well as to provide a scanning method permitting a simple optical system and a control circuit.

To realize the above object, a sharp beam for obtaining a sharp signal has a phase difference against an unsharp beam for obtaining an unsharp signal, consequently enabling both the beams to scan the original picture separately.

The above and other objects and features of this invention can be appreciated more fully from the following detailed description when read with reference to the accompanying drawings.

PREFERRED EMBODIMENT OF THE INVENTION

Figure 1:
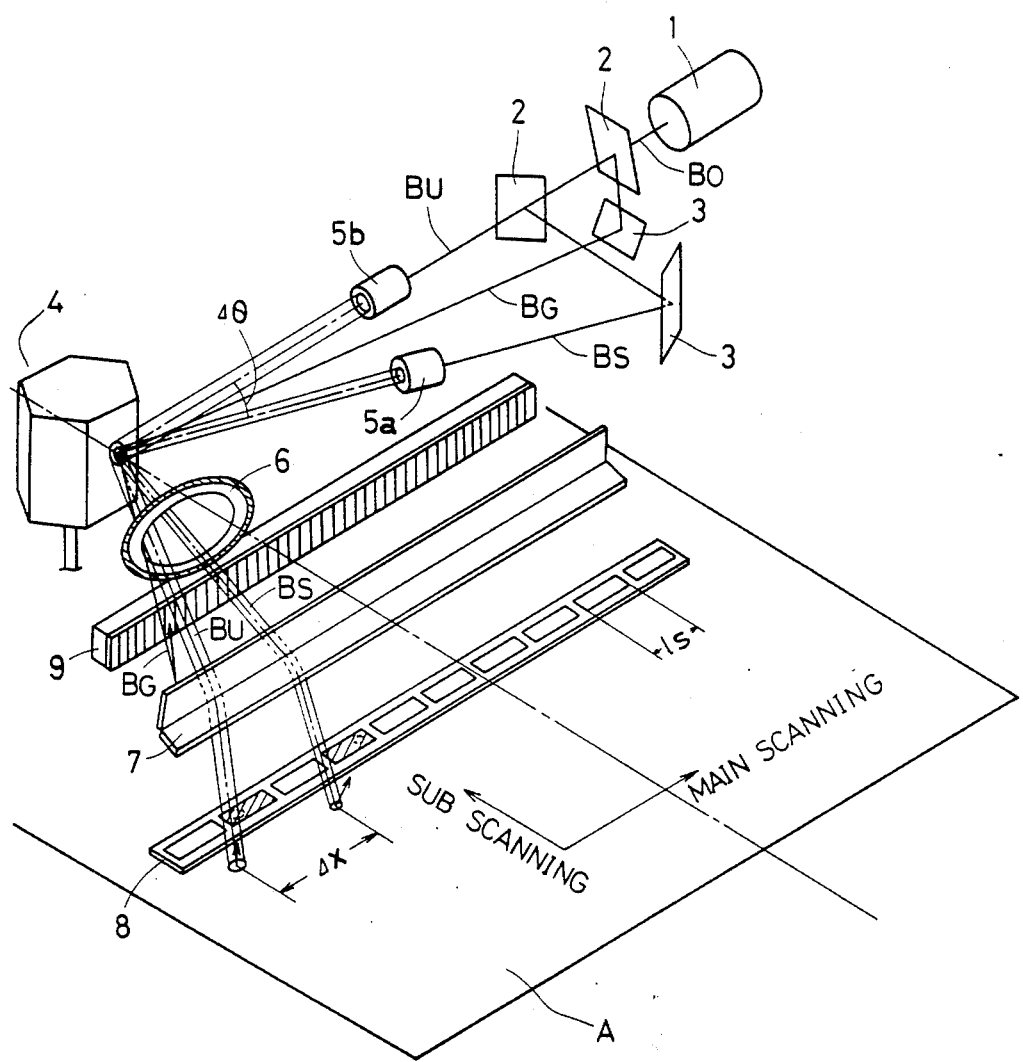
FIG. 1 is an optical system of an embodiment of this invention.

FIG. 1 shows an optical system of an embodiment of this invention in which a polygon mirror and an $f\theta$ lens are employed as a beam deflector and an object lens respectively. In this embodiment, a laser beam $B_O$ from a beam producer 1 (for example a laser generator) diverges into three beams $B_S$, $B_U$, and $B_G$ by the operation of half mirrors 2 and mirrors 3. From among said three beams, the beams $B_S$ and $B_U$ are directed toward the direction perpendicular to an original picture, and the beam $B_G$ is directed toward the direction parallel to the original picture at first. Then the beams $B_S$ and $B_U$ run onto the beam deflector 4 making an incident angle of $\Delta\theta$ between them, and the beams $B_S$ and $B_U$ are expanded by respective beam expanders 5a and 5b provided on their optical path, when the beams are expanded to have several diameters. The beam $B_S$ having smaller diameter is used as a sharp beam and the beam $B_U$ having greater diameter is used as an unsharp beam. The beams $B_S$ and $B_U$ reflected at the beam deflector 4 run via the object lens ($f\theta$ lens) 6 and a refraction mirror 7 to the surface of the original picture A keeping certain interval between them. For example, the sharp beam $B_S$ having smaller diameter precedes the unsharp beam $B_U$ having greater diameter (keeping certain phase difference) when scanning the original picture. Then sharp and unsharp signals are detected from reflected beams by a photo-sensor array 8, and a detail-emphasized image signal (unsharp mask signal) is obtained by using the sharp and the unsharp signals. Though FIG. 1 shows an embodiment in which the sharp beam $B_S$ precedes the unsharp beam $B_U$, a reversed proceeding can be applied.

In the abovementioned situation, said incident angle $\Delta\theta$ is derived from the equation $\Delta\theta = \Delta X/f$, wherein $\Delta X$ is a distance between both beams on the original picture and "f" is the focal distance of said $f\theta$ lens. Assuming that the photo-sensor array 8 has photo-sensor units, eacjh of which has unit length $ls = 1$ inch (25.5 mm), said distance between both beams on the original picture is set up in 63.75 mm which corresponds to two and one-half sensor units to avoid mutual interference, and the focal distance "f" of the $f\theta$ lens is set up in 490 mm, the incident angle $\Delta\theta$ is derived from the following equation.

$$\Delta\theta = \Delta X/f = 0.3 \text{ rad} = 7.45°$$

In the meantime, the beam $B_G$ used as a grating beam is reflected at the beam deflector 4 and runs via the object lens 6 and the refraction mirror 7 into an optical grating 9 arranged against the refraction mirror 7. A photo-sensor array integrated with the grating 9 detects a grating signal from the beam, and the grating signal is used as a control signal for making an unsharp mask signal.

Figure 2:
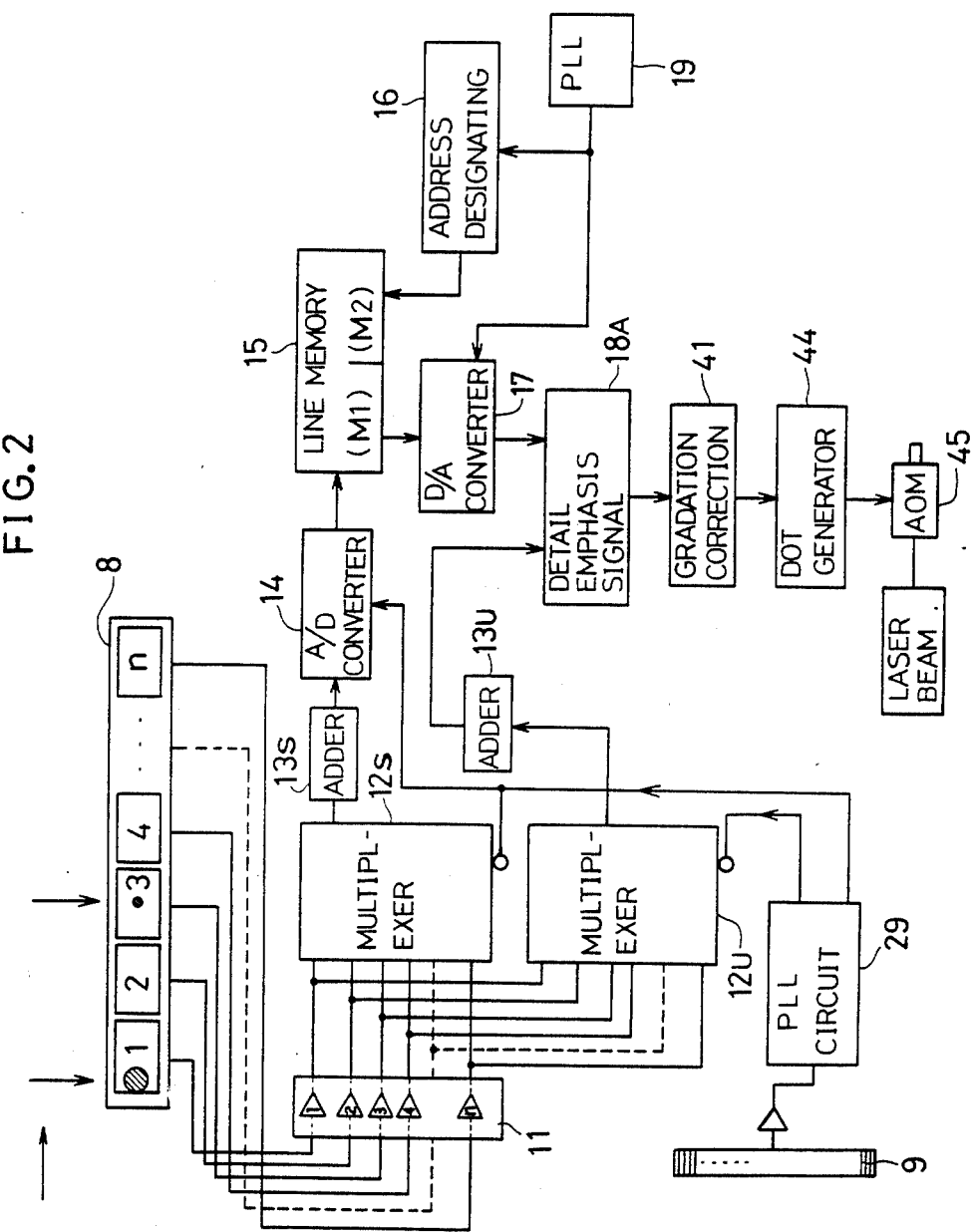
FIG. 2 is a processing circuit for the optical system shown in FIG. 1.
Figure 3:
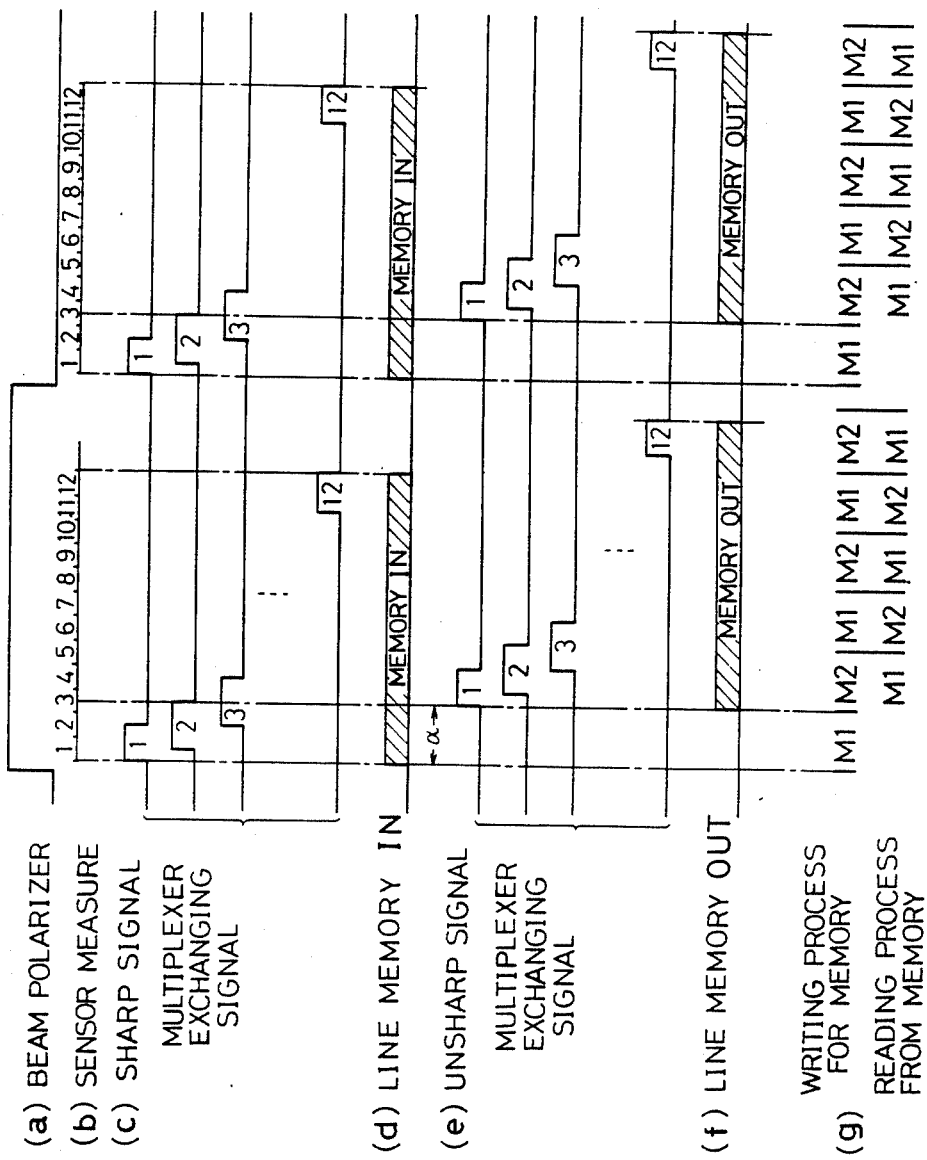
FIG. 3 is a timing chart of the circuit shown in FIG. 2.

FIG. 2 shows an example of a circuit to generate a detail-emphasized signal by using the sharp beam and the unsharp beam, and FIG. 3 shows a timing chart of the circuit.

At first, a grating signal obtained from the photo-sensor array 8 integrated with the grating 9 is input to a PLL circuit 29 which generates timing pulses for controlling multiplexers 12s and 12u (mentioned later) and other circuits.

Then signals corresponding to the sharp beam $B_S$ and the unsharp beam $B_U$ obtained from the photo-sensor array 8 are input via a pre-amplifier 11 to the multiplexer 12s for a sharp signal and to the multiplexer 12u for an unsharp signal respectively. These multiplexers 12s and 12u operate keeping the phase difference $\alpha$ corresponding to the distance between the sharp beam $B_S$ and the unsharp beam $B_U$ on the original picture (in this case, it is equivalent to the length of two and half sensor units as shown in FIG. 3(b)).

In this, the sharp signal and the unsharp signal is obtained by utilizing data from the adjacent sensor units to detect signals from a constant area. That is, when the fore part of the second sensor unit is used for signal detection, signals from the second sensor unit and from the first sensor unit are mixed in adders 13s and 13u. And when the hind part of the second sensor unit is used, signals from the second sensor unit and the third sensor unit are mixed in adders 13s and 13u. In this case, the operation is done by the multiplexers 12s and 12u, and the actual scanning is done from the fore end of the second photo-sensor.

The thus obtained sharp signal is converted from an analog form into a digital form in an analog/digital converter 14 and written into a line memory 15 being designated of their addresses by an address designating circuit 16. Said line memory 15 is composed of the first memory area ($M_1$) and the second memory area ($M_2$), whereby the memory area ($M_1$) and the memory area ($M_2$) are alternately used for every sharp signal of the original picture corresponding to the distance between the sharp signal and the unsharp signal as shown in FIGS. 3(d), (f) and (g). The sharp signal read from the line memory 15 is input to a detail emphasis signal generator 18A after converted from a digital form into an analog form in a digital/analog converter 17.

On the other hand, the unsharp signals obtained from two adjacent sensor units are output from the multiplexer 12u and mixed in the adder 13u in the same manner explained for the sharp signal. And the unsharp signal from the adder 13u is input to the detail emphasis signal generator 18A.

The detail emphasis signal generator 18A computes an unsharp mask signal by subtracting the unsharp signal from the sharp signal. And the unsharp mask signal is added to the sharp signal (image signal) to make a detail-emphasized image signal.

The thus obtained detail-emphasized image signals are input via a gradation correction circuit 41 and a dot generator 44 to an acousto-optic modulator (AOM) 45 to control recording beams. Of course a color correction circuit and a magnification conversion circuit etc. (not shown in FIG. 2) can be adopted to the method of this invention as well as conventional color scanners, but no explanation for such circuits is mentioned here because they do not concern directly the method of this invention.

Figure 4:
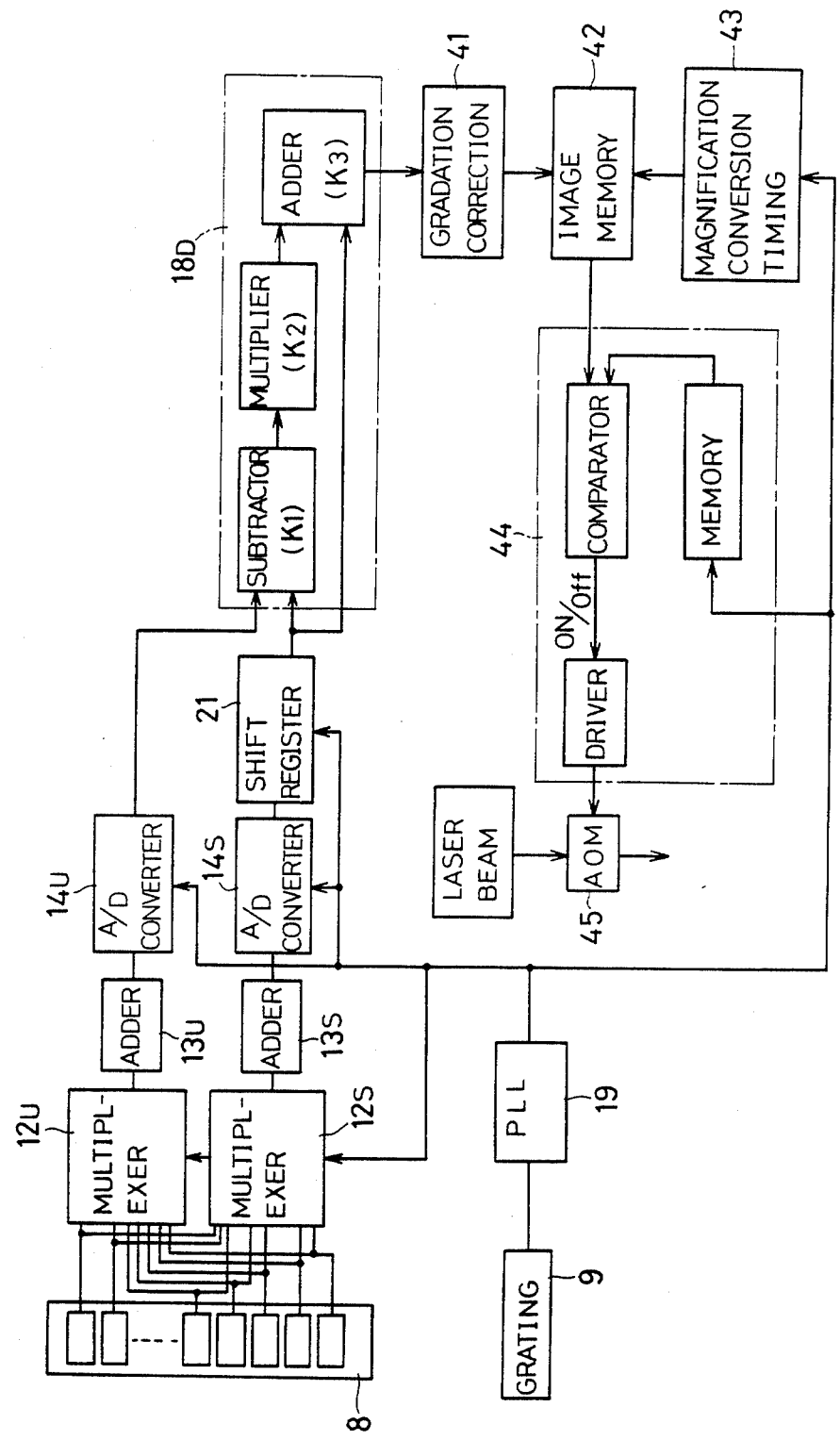
FIG. 4 is a processing circuit for the optical system shown in FIG. 2.

Though the abovementioned embodiment employs an analog-type detail emphasis circuit, FIG. 4 shows a digital-type detail emphasis circuit.

As in the system shown in FIG. 4, sharp and unsharp signals output from respective adders 13s and 13u are converted from an analog form into a digital form in respective analog/digital converters 14s and 14u. After that, one out of both signals which is advanced in phase, for example the sharp beam, is temporally stored in a shift register 21 and input to a detail emphasis signal generator 18D after being synchronized with the unsharp beam.

In the detail emphasis signal generator 18D, at first a subtraction S(sharp signal)−U(unsharp signal) is performed by a subtraction circuit $K_1$. Then a multiplication $(S−U) \times k$ (k is a constant) is performed by a multiplication circuit $K_2$ and an addition $S + k(S−U)$ is performed by an adder $K_3$. The detail-emphasized image signal is input via a gradation correction circuit 41 to an image memory 42. Then the image signal is read from the image memory 42 on order of a timing pulse from a magnification conversion timing circuit 43 and is input via a dot generator 44 to an acousto optic modulator 45 to control the recording beam.

This dot generator 44 consists of a memory loaded with a dot pattern and a comparator etc., but no explanation is presented here because this is not a main object of this invention.

Figure 5:
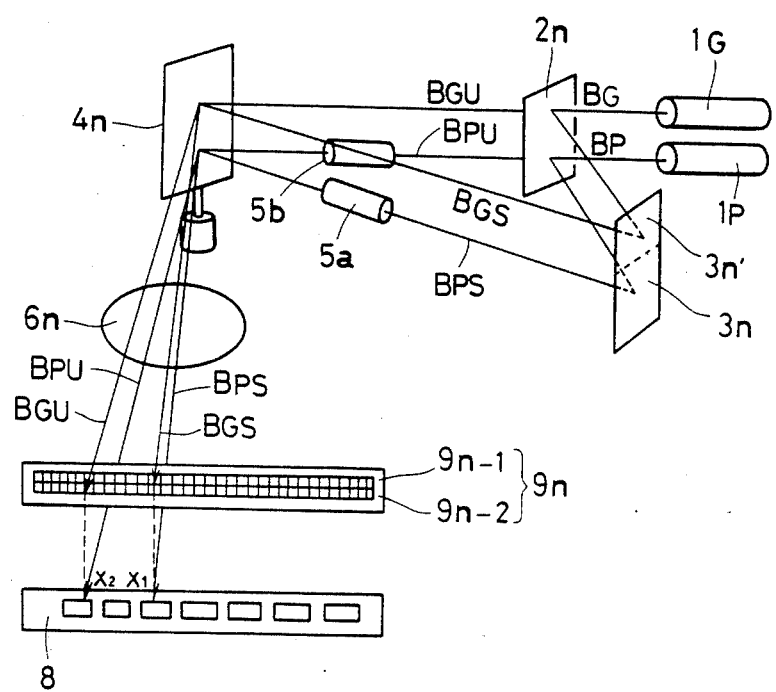
FIG. 5 is an optical system of another embodiment of this invention.

FIG. 5 shows another embodiment of the method of this invention in which an $f \tan \theta$ lens is employed as the object lens instead of aforesaid $f\theta$ lens.

In this case, phase difference between the advanced beam and the succeeding beam is not constant. So two optical grating are provided for respective beams to operate as follows. At first image data of one scanning line obtained by the advanced beam (the sharp beam for example) is sustained on a line memory. Then the image data are read from the line memory on order of a clock pulse synchronizing with the detection of the succeeding beam by a grating for the beam to obtain a properly detail-emphasized image signal. More precisely, a pickup beam $B_P$ from a laser beam producer $1_P$ diverges into two beams at a half mirror $2_n$ and one of the beams is reflected on a mirror $3_n$ to run onto a galvano mirror $4_n$ making an incidence angle between both beams. Both beams from the galvano mirror $4_n$ run through an object lens $6_n$ to scan the surface of an original picture keeping a certain interval between them according to the revolution of the galvano mirror $4_n$ and thus relfected beams from the original picture are detected by a photo-sensor array 8.

Meanwhile, a grating beam $B_G$ from a laser beam producer $1_G$ diverges into two beams $B_{GU}$ and $B_{GS}$ at the half mirror $2_n$ and run onto the galvano mirror $4_n$ keeping the same angle made by the beams $B_{PU}$ and $B_{PS}$. Then the beams $B_{GU}$ and $B_{GS}$ reflected on the galvano mirror $4_n$ run through the object lens $6_n$ to a grating $9_n$. In this, the grating $9_n$ is composed of two grating ranks $9_{n-1}$ and $9_{n-2}$. Into the grating rank $9_{n-1}$, for example the grating beam $B_{GS}$ corresponding to the sharp beam $B_{PS}$ enters, while into the grating rank $9_{n-2}$, for example the grating beam $B_{GU}$ corresponding to the unsharp beam $B_{PU}$ enters.

Figure 6:
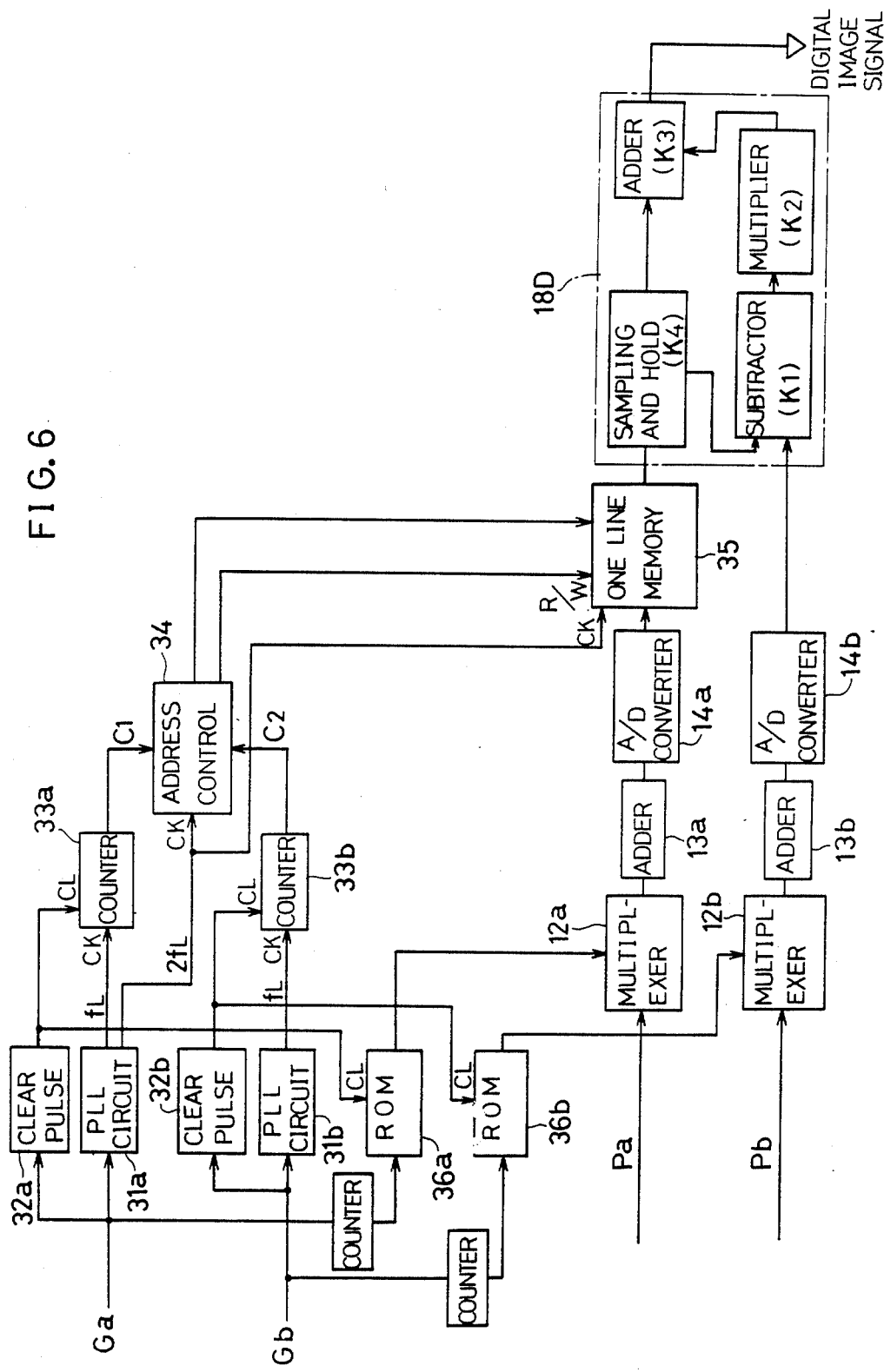
FIG. 6 is a processing circuit for the optical system shown in FIG. 5.
Figure 7:
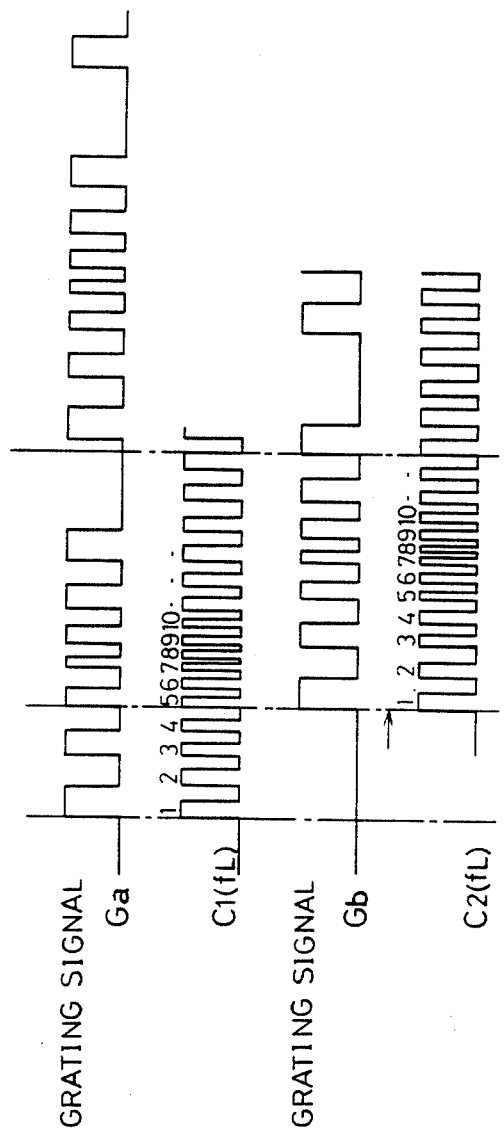
FIG. 7 is a timing chart of the circuit shown in FIG. 6.

Each signal picked up in the abovementioned way by the optical system is processed in a processor as shown in FIG. 6. FIG. 7 shows a timing chart of the processer. For example the advanced grating signal $G_a$ output from the grating $9_{n-1}$ is input to a PLL circuit 31a. The PLL circuit 31a outputs a clock pulse $f_L$ synchronizing with the grating signal $G_a$ and a pulse $2f_L$ having two-fold frequency of the clock pulse $f_L$. The clock pulse $f_L$ has a frequency corresponding to the resolving power of the image signal. The clock pulse $F_L$ is counted in a counter 33a from the time the first clock pulse of the grating signal is detected by a clear pulse generator 32a. An output signal $C_1$ from the counter 33a is input to an address control circuit 34 as a writing address signal corresponding to the scanning start position of the advanced beam. And the image signal obtained by the advanced beam is stored in a one line memory 35 until an image signal $P_6$ corresponding to the grating signal of the succeding beam is input to a detail emphasis signal generator 18D. After that, the clock pulse $F_L$ from a PLL circuit 31b is counted by a counter 33b on order of a clear pulse generator 32b from the time the succeeding beam begins to scan the original picture. An output signal $C_2$ from the counter 33b becomes to be a reading address signal corresponding to the scanning pont of the succeeding beam on the original picture to read the corresponding image data obtained by the advanced beam. To write into or read from the one line memory 35 the image data from the advanced beam, said address control circuit 34 is controlled by a clock pulse of which frequency is $2f_L$.

In the meantime, designation that image data from which sensor units are input to the adder 13a and to the adder 13b is made for example in the following way. At first, a relation between respective intensity level distribution of the advanced beam and the succeeding beam on the original picture and the grating signals $G_a$ and $G_b$ which represents the places of both beams obtained from the photo sensor array 8 is calculated beforehand. Output signals from the counter 33a and 33b are input to respective ROMs 36a and 36b, wherein said output sigals are used as address signals. When the address (number) signals come up on sensc units situated in a portion where the intensity level is above setup level, designation signals for the sensor units are output from the ROMs 36a and 36b to respective multiplexers 12a and 12b. The multiplexers 12a and 12b input image signals $P_a$ and $P_b$ from the sensor units to adders 13a and 13b respectively on order of the designation signal.

Incidentally, a sampling and hold circuit K4 is provided in the detail emphasis signal generator 18D of the embodiment shown in FIG. 6 in contrast to the embodiment shown in FIG. 4 to make the reading timing of the image data obtained by the advanced beam from the one line memory 35 synchronize with the input timing of the image data obtained by the succeeding beam.

Though the above embodiment adopts a way of setting up a phase difference of between the sharp and the unsharp beam in the main scanning direction when they are used for scanning the original picture, the phase difference can also be set up in the sub-scanning direction.

As mentioned above, the method of this invention employs two beams having different diameters with each other for scanning the original picture, which results in being free from conventional defects of this kind of scanner and in being permitted to have a simpler optic and control system.

We claim:

1. A method of detail emphasis in an electronic image reproduction system, comprising the steps of:
   providing first and second light beams having first and second diameters and corresponding, respectively, to sharp and unsharp signals to be obtained;
   impinging said first and second beams on a beam reflecting means at an angle to each other and to an original such that the two beams reflected from said reflecting means scan the original along common scanning lines, one beam preceding the other, with a predetermined phase difference therebetween;
   advancing the original perpendicular to the direction of the scanning lines;
   exposing a photosensor array having successive discrete photosensitive elements to the two beams, respectively, and in response, generate sharp and unsharp signals;
   storing in a memory the one of the sharp and unsharp signals preceding the other;
   reading the stored signal from the memory at the same time that a signal corresponding to the other one of the sharp and unsharp signals is obtained at the same point on the original;
   processing the sharp and unsharp signals obtained at the same point on the original to provide a detail emphasis signal; and
   processing said detail signal to obtain a detail emphasized reproduction image.

2. A system for detail emphasis in electronic image reproduction, comprising:
   laser means for developing first and second coherent light beams having different diameters corresponding, respectively, to sharp and unsharp signals to be obtained;
   beam reflecting means;
   objective lens means;
   means for impinging said first and second beams on said reflecting means at an angle to each other and to an original such that the two beams reflected from said reflecting means scan an original through said lens along common scanning lines, one beam preceding the other, with a predetermined phase difference therebetween;
   means for advancing the original perpendicular to the direction of the scanning lines;
   a photosensor array having successive discrete photosensitive elements positioned to detect, respectively, the two beams and, in response, generating sharp and unsharp signals;
   a memory;

means for storing in said memory the one of the sharp and unsharp signals preceding the other;
means for reading the stored signal from the memory at the same time that a signal corresponding to the other one of said sharp and unsharp signals is obtained at the same point on the original;
means for processing the sharp and unsharp signals at the same point on the original to obtain a detail emphasis signal; and
means for processing said detail emphasis signal to obtain a detail emphasized reproduction image.

3. The system of claim 2, wherein said reflecting means comprises a polygon mirror.

4. The system of claim 2, wherein said reflecting means comprises a galvano mirror.

* * * * *